(12) United States Patent
Ferragut et al.

(10) Patent No.: US 9,361,463 B2
(45) Date of Patent: Jun. 7, 2016

(54) DETECTION OF ANOMALOUS EVENTS

(71) Applicant: UT-Battelle, LLC, Oak Ridge, TN (US)

(72) Inventors: Erik M. Ferragut, Oak Ridge, TN (US);
Jason A. Laska, Oak Ridge, TN (US);
Robert A. Bridges, Knoxville, TN (US)

(73) Assignee: UT-Batelle, LLC, Oak Ridge, TN (US)

( * ) Notice: Subject to any disclaimer, the term of this patent is extended or adjusted under 35 U.S.C. 154(b) by 15 days.

(21) Appl. No.: 14/103,703

(22) Filed: Dec. 11, 2013

(65) Prior Publication Data

US 2015/0161394 A1   Jun. 11, 2015

(51) Int. Cl.
*G06F 21/57* (2013.01)
*G06F 21/55* (2013.01)
*H04L 29/06* (2006.01)

(52) U.S. Cl.
CPC ............ *G06F 21/577* (2013.01); *G06F 21/552* (2013.01); *H04L 63/1425* (2013.01)

(58) Field of Classification Search
CPC ............ H04L 63/1425; H04L 41/5009; H04L 43/0864; H04L 69/22; H04L 69/16; H04L 43/16; H04L 63/1408; G06F 21/577; G06F 21/552
USPC .......................................................... 726/25
See application file for complete search history.

(56) References Cited

U.S. PATENT DOCUMENTS

| | | | |
|---|---|---|---|
| 7,748,039 B2 | 6/2010 | Obrecht et al. | |
| 8,015,133 B1 | 9/2011 | Wu et al. | |
| 8,601,575 B2 * | 12/2013 | Mullarkey et al. | 726/22 |
| 2008/0271143 A1 | 10/2008 | Stephens et al. | |
| 2009/0030752 A1 | 1/2009 | Senturk-Doganaksoy et al. | |
| 2010/0281539 A1 | 11/2010 | Burns et al. | |
| 2011/0185422 A1 * | 7/2011 | Khayam et al. | 726/23 |
| 2012/0210423 A1 | 8/2012 | Friedrichs et al. | |
| 2012/0278477 A1 * | 11/2012 | Terrell et al. | 709/224 |
| 2013/0198119 A1 | 8/2013 | Eberhardt, III et al. | |
| 2014/0149806 A1 * | 5/2014 | Khalastchi et al. | 714/49 |
| 2015/0106927 A1 | 4/2015 | Ferragut et al. | |
| 2015/0135262 A1 * | 5/2015 | Porat | H04L 63/145 726/1 |

OTHER PUBLICATIONS

Cao et al., "Integration of Self-organizing Map (SOM) and Kernel Density Estimation (KDE) for Network Intrusion Detection," Unmanned/Unattended Sensors and Sensor Networks VI. Edited by Carapezza, Edward M. Proceedings of the SPIE, vol. 7480, article id. 74800N, 12 pp., 2009.

(Continued)

*Primary Examiner* — Ali Abyaneh
*Assistant Examiner* — Narciso Victoria
(74) *Attorney, Agent, or Firm* — Klarquist Sparkman, LLP

(57) ABSTRACT

A system is described for receiving a stream of events and scoring the events based on anomalousness and maliciousness (or other classification). The system can include a plurality of anomaly detectors that together implement an algorithm to identify low-probability events and detect atypical traffic patterns. The anomaly detector provides for comparability of disparate sources of data (e.g., network flow data and firewall logs.) Additionally, the anomaly detector allows for regulatability, meaning that the algorithm can be user configurable to adjust a number of false alerts. The anomaly detector can be used for a variety of probability density functions, including normal Gaussian distributions, irregular distributions, as well as functions associated with continuous or discrete variables.

30 Claims, 7 Drawing Sheets

(56) References Cited

OTHER PUBLICATIONS

Chandola et al., "Anomaly dection: A survey," Journal ACM Computing Surveys (CSUR), vol. 41, Issue 3, Jul. 2009, Article No. 15, 58 pages.

Cook et al., "VAST Challenge 2012: Visual Analytics for Big Data," IEEE Vast, p. 251-255, IEEE Computer Science Society, Oct. 2012.

Denning, "An Intrusion-Detection Model," IEEE Transactions on Software Engineering, vol. 13, Issue 2, Feb. 1987, pp. 222-232.

Gu et al., "BotMiner: Clustering Analysis of Network Traffic for Protocol- and Structure-Independent Botnet Detection," Proceedings of the 17th conference on Security sympiosium, pp. 139-154, 2008.

Huang et al., "In-Network PCA and Anomaly Detection," Advances in Neural Information Processing Systems, pp. 617-624, 2006.

Portnoy et al., "Intrusion Detection with Unlabeled Data Using Clustering," Proceedings of ACM CSS Workshop on Data Mining Applied to Security, 2001, 14 pages.

Tandon et al., "Tracking User Mobility to Detect Suspicious Behavior," In SDM, pp. 871-883, 2009.

\* cited by examiner

| Source | Destination | | | | |
|---|---|---|---|---|---|
| | W | F | D | S | U |
| W | 0 | 0.3667 | 0 | 0.6254 | 0 |
| F | 0.0000003 | 0 | 0 | 0 | .00008 |
| D | 0.000012 | 0 | 0.0000317 | 0 | 0.0000461 |
| S | 0 | 0.0013673 | 0 | 0 | 0.0003282 |
| U | 0 | 0.0019842 | 0 | 0.00386 | 0.0001351 |

| Source | Destination | | | | |
|---|---|---|---|---|---|
| | W | F | D | S | U |
| W | | 1.417 | | 0 | |
| F | 21.669 | | | | 12.525 |
| D | 16.311 | | 14.472 | | 13.438 |
| S | | 8.966 | | | 10.626 |
| U | | 7.971 | | 6.994 | 11.68 |

SOFTWARE 1180 IMPLEMENTING DESCRIBED TECHNOLOGIES

DETECTION OF ANOMALOUS EVENTS

ACKNOWLEDGMENT OF GOVERNMENT SUPPORT

This invention was made with government support under Contract No. DE-AC05-00OR22725 awarded by the U.S. Department of Energy. The government has certain rights in the invention.

BACKGROUND

Anomaly detection is the search for items or events which do not conform to an expected pattern. The detected patterns are called anomalies and translate to critical and actionable information in several application domains.

There are different categories of anomaly detection including unsupervised and supervised anomaly detectors. Unsupervised anomaly detection techniques detect anomalies in an unlabeled test data set under the assumption that the majority of the instances in the data set are normal by looking for instances that seem to fit least to the remainder of the data set. Supervised anomaly detection techniques require a data set that has been labeled as "normal" and "abnormal" and involves training a classifier.

Anomaly detection is applicable in a variety of domains, such as intrusion detection, fraud detection, fault detection, event detection in sensor networks, etc. Nonetheless, a particular type of intrusion detection has remained problematic. More specifically, a zero-day attack or threat is an attack that exploits a previously unknown vulnerability in a computer application. Zero-day attacks are used or shared by attackers before the developer of the target software knows about the vulnerability. As such, they can be very difficult to defend against.

DETAILED DESCRIPTION

A system is described for receiving a stream of events and scoring the events based on anomalousness and maliciousness (or other classification). The system can include a plurality of anomaly detectors that together implement an algorithm to identify low-probability events and detect atypical traffic patterns. The anomaly detector provides for comparability of disparate sources of data (e.g., network flow data and firewall logs.) Additionally, the anomaly detector allows for regulatability, meaning that the algorithm can be user configurable to adjust a number of false alerts. The anomaly detector can be used for a variety of probability density functions, including normal Gaussian distributions, irregular distributions, as well as functions associated with continuous or discrete variables.

The system provides a probabilistic approach to anomaly detection. Specifically, given a data set with a probability distribution, a definition of an anomaly score depends on the probability distribution. The system can be applicable to any distribution and is comparable across disparate distributions. A threshold can be set which defines all data points with an anomaly score greater than the threshold as anomalous. Comparability across thresholds means that the anomaly score picks off the same percentage of most anomalous data points as the distribution changes, but the threshold is held constant. Thus, using embodiments described herein, a network flow anomaly can be compared to a firewall log anomaly, which is challenging if they adopt different or ad hoc anomaly detection approaches. Some embodiments can also provide regulatability in the sense that analysts can, in advance, set the proportion of false alerts. A definition of false alerts, in the context of unsupervised learning, is in order. The anomaly detection method can be applied to two types of data. The first is data produced similarly to training data. The second is data produced by a different, unknown method. Data produced similarly to the training data but that is flagged as anomalous is a false alert. The rate of false alerts does not depend on the choice of the second source of data as the model was trained without access to that source. In cyber security, the size of the data sets are so large that even a relatively small number of false alerts can have an impact. For example, a false alert rate of 0.001 may seem small, but in a network with one million events per hour, there would be 1000 false alerts per hour. Of course, reducing the false alert rate inevitably reduces the true alert rate as well.

Figure 1:
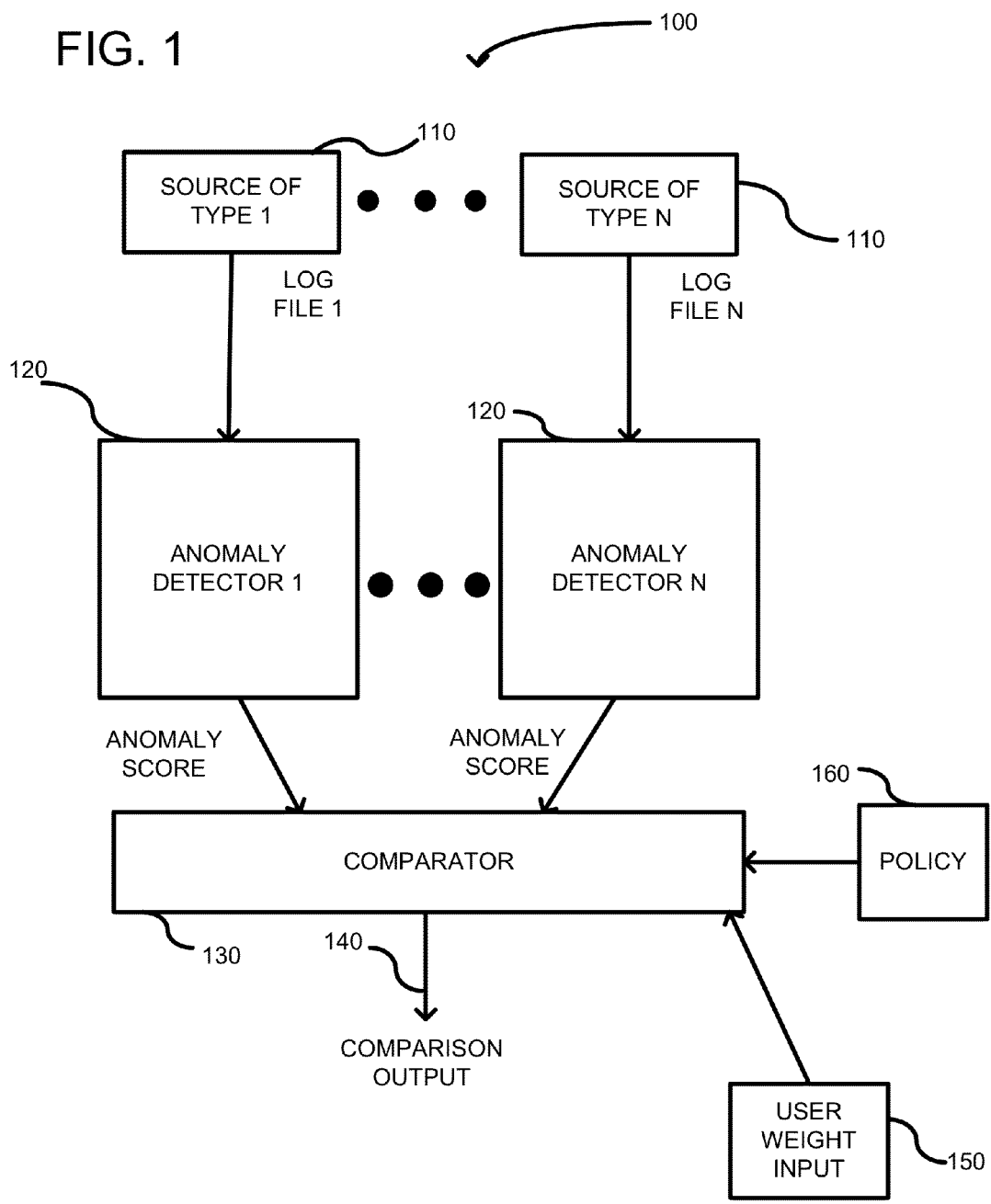
FIG. 1 is a system diagram for detecting anomalous events.

A particular system 100 is shown in FIG. 1. Multiple input sources are shown at 110 and any number of input sources can be used (N input sources are shown, where N is any integer value). The sources can be any of a variety of hardware or software resources. A particular environment in which the embodiments described herein can be used is a network environment. In a network environment, the sources 110 can be network sources of different types. For example, the network sources can be workstations, firewalls, DNS, web servers, etc. Thus, the sources can have different platforms and generate disparate log files (e.g., the log files can relate to events associated with different variable types). The source 110 can also be a source that provides streaming data. The log file or input stream typically includes events, which are actions or occurrences that are detected by a program or hardware component. The events can be associated with a time-stamp in conjunction with captured data. The format of the input stream can vary depending on the source 110, but generally the input streams include a network address (e.g., an IP address) and a time stamp. Other examples of the input stream include firewall data that includes source and destination IP addresses, source and destination port addresses, a protocol, and a message value defined by the firewall. Still another example of the input stream can be network data that includes source and destination IP addresses, source and destination ports, a protocol, and bytes or packets associated with message data. Each log file or input stream can be received in its respective anomaly detector 120. A plurality of anomaly detectors 120 can sit in parallel, one for each log file. In some embodiments, the anomaly detectors can include memory registers and processing capacity to implement a parser, which analyzes the syntax of the input streaming data and transforms it into a standard format (e.g., JSON or other text-based languages).

Each anomaly detector 120 generally produces an anomaly score that can be used as an input to a comparator 130. The score is dependent on an anomalousness of the event. Thus, the anomaly detector can transform a log file or log streaming data into a score based on the anomaly calculation. Despite that the log files can be disparate, the anomaly detectors 120 can generate a comparable score through use of the following equation:

$$A_f(x) := -\log_2 P_f(f(X) \leq f(x))$$

More generically, the formula can be as follows:

$$A_f(x) = -\log_b P_f(f(X) \leq f(x)) \text{ where } b > 1.$$

As discussed further below, the anomaly score $A_f(x)$ for a random variable X is predictable and $P_f(A_f(x))$ can be bounded independent of f under the assumption that X is generated according to the distribution described by f. Each anomaly detector 120 can have an independently adjustable tuning parameter that assists in making the output anomaly scores comparable.

The comparator 130 can generate an output score 140. A variety of comparators can be used, but in some embodiments the comparator can generate the output 140 using a linear combination of anomaly scores. The linear combination can use weighting parameters associated with a user weight input file 150 or an input policy document 160.

The above definition of anomalousness is based on the probability of the probability. The advantages of this approach is that it allows for regulatability and comparability. This can be demonstrated by considering the threshold selection problem. If a threshold of, say, 10 is set in advance, then an event with a probability $2^{-10}$ or lower would be considered anomalous. Now consider a uniform discrete distribution. If it has 100 possible values, then none of the events are considered anomalous. However, if it has 2000 possible values, then they are each considered anomalous even though they are each maximally likely. A regulatable definition of anomalousness would be self-adapting to these various distributions. Intuitively, it is not just the rarity of the event itself, but how surprising that rarity is in the context of the distribution.

As indicated above, the different log files are generated from a multiplicity of sources 110, each with their own properties. Suppose that we observe two types of discrete variables, one has two possible values and another that has a thousand possible values. An ideal definition of anomalousness would apply to both distributions without requiring the tuning of a parameter for each dataset, and yet would allow for the direct comparison of the anomalousness of values of one variable with values of the other variable. A direct comparison can be accomplished by considering not the rarity of the event itself, but how rare the rarity of an event is.

As discussed above, the anomaly detectors 120 can generate an anomaly score for x using the following definition: $A_f(x) := -\log_2 P_f(f(X) \leq f(x))$ wherein a (discrete or continuous) random variable X is given with probability density or mass function $f$ defined on domain D, with $A_f : D \to \mathbb{R}_{\geq 0}$ It is worth noting that $A_f$ is defined on D, the same domain as f. The negative log is used for numerical reasons and so that larger anomalousness corresponds to larger numbers. Also, since the probabilities of interest are likely to be very close to zero, the use of log helps emphasize their differences. Nonetheless, the log need not be included and is an implementation detail. The choice of base 2 for the log is so that the anomalousness is, in an information theoretic sense, measured in bits.

Figure 2:
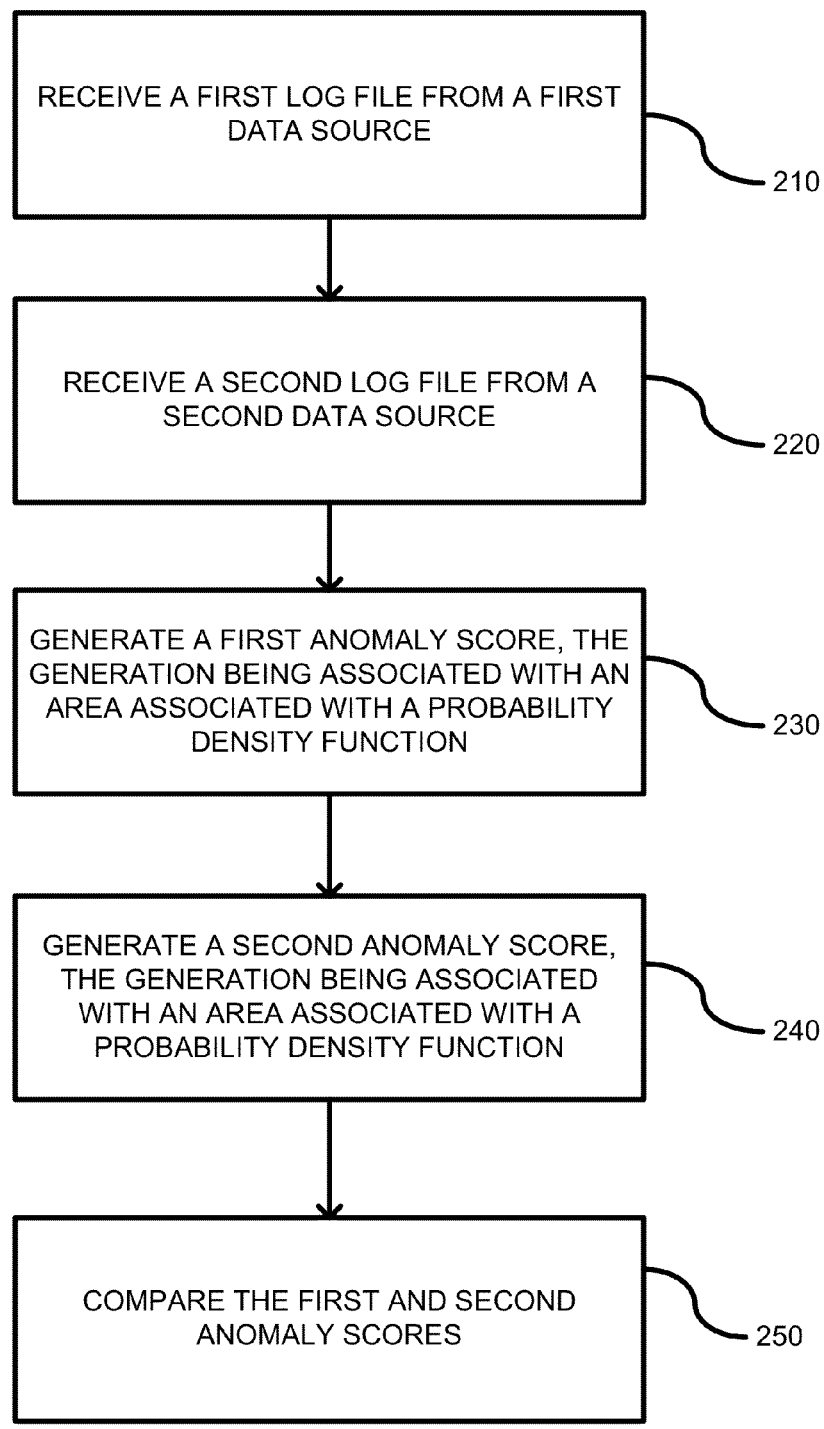
FIG. 2 is a flowchart of a method according to one embodiment for detecting anomalous events.

FIG. 2 is a flowchart of a method according to one embodiment for detecting anomalous events. In process block 210, a first log file from a first data source can be received. As previously indicated, the source can be a network-based source (hardware or software) or a non-network based source. Virtually any source that produces a log file can be used, wherein the log file can be a discrete file or continuous streaming data. In process block 220, a second log file can be received from a second data source, wherein the second data source can be a different type than the first data source. An example of different data sources are those that use a different hardware platform or different software platform. Alternatively, the different data sources can generate log files that include disparate event types. In one example, the disparate event types can include different variable types (e.g., multinomial variables vs. Gaussian mixture variables). In process block 230, a first anomaly score can be generated. Thus, for example, an anomaly detector can receive the first log file and transform it into an anomaly score using a form of the definition $A_f(x) := P_f(f(X) \leq f(x))$. This equation can also include a multiplier, such as a constant or a log function to allow small discrepancies to be more easily spotted. In process block 240, a second anomaly score can be generated using a similar definition. Thus, the second log file can be transformed into a second anomaly score. Despite that the log files can contain disparate events, the anomaly detectors can generate scores that are directly comparable. A tuning parameter, described further below, can assist in making the scores at a comparable level. In process block 250, an automatic comparison can be made, such as by detecting which anomaly score is larger. Various comparison techniques are well understood in the art and need not be repeated. The method can easily be scaled to include additional log files by simply adding anomaly detectors in parallel.

Figure 3:
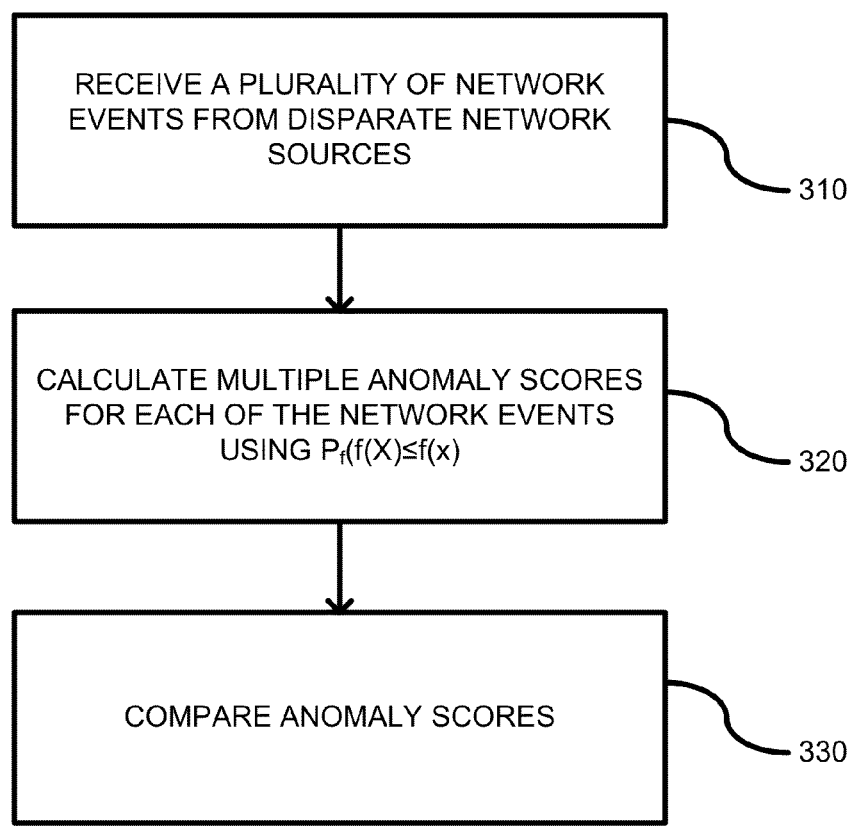
FIG. 3 is a flowchart of a method according to another embodiment for detecting anomalous events.

FIG. 3 shows another embodiment of a method that can be used for detecting anomalous events. In this embodiment, anomalous events related to a network are specifically addressed. In process block 310, a plurality of network events can be received from disparate network sources. The network sources can be from workstations, firewalls, DNS, Web servers, or other network devices. In process block 320, multiple anomaly scores can be calculated for each of the network events using a form of the equation, $A_f(x) := P_f(f(X) \leq f(x))$, such as $A_f(x) := -\log_2 P_f(f(X) \leq f(x))$. In process block 330, the multiple anomaly scores can be compared in any desired manner.

Figure 4:
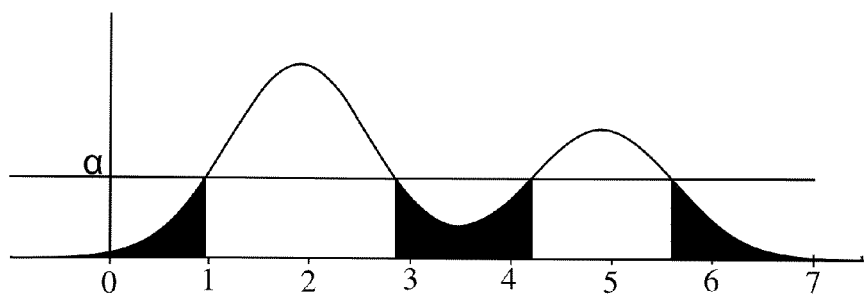
FIG. 4 is a graph illustrating a probability density function with a tunable parameter α used to adjust an area below the tunable parameter.

The above definition of an anomaly score can be interpreted with respect to the graph of the probability density, as shown in FIG. 4. Given an event x, $P_f(f(X) \leq f(x)) = \int \{t | f(t) \leq f(x)\} f(t) dt$, hence $P_f(f(X) \leq f(x))$ equals the area of the shaded region, under the line defined by α. The negative log base two of that area is the bits of meta-rarity (i.e., anomaly score).

An example of the definition can be illustrative of its benefits. Consider a discrete uniform distribution in which each event has the same probability. For any x, the probability of the random variable X having probability mass $f(X)$ less than or equal to $f(x)$ is one. Therefore, $A_f(x) = -\log_2 1 = 0$ for all x in the distribution. This is a particular case of the general observation that any mode of a distribution has anomaly score 0.

Without selecting a threshold or tuning a parameter α, a conclusion can be made that a discrete uniform distribution has no anomalies.

An advantage of this definition of anomaly is that $A_f(X)$ for a random variable X is predictable, and $P_f(A_f(X))$ can be bounded independent of $f$ under the assumption that X is generated according to the distribution described by $f$.

The following theorem can be used to prove this: Let X be distributed according to probability distribution $f$. Then the probability that the anomalousness exceeds α is no greater than $2^{-\alpha}$. That is, $$P_f(A_f(x) > \alpha) \leq 2^{-\alpha}$$

The more generic formula being $P_f(A_f(x) \geq \alpha) \leq b^{-\alpha}$ where $b > 1$.

By this theorem, the proportion of events flagged as false alerts at the α level is no more than $2^{-\alpha}$ for samples generated according to $f$. In particular, the number of false alerts at a given threshold is independent of $f$. Hence, false alerts can be regulated by selecting an appropriate α. Furthermore, if X is produced according to $f$ and Y is produced according to g, then $A_f(X)$ and $A_g(Y)$ are comparable since they are both negative log probabilities. This definition of anomalousness therefore provides comparability across different sources even if each source is modeled using a different probability distribution.

Note that the bits of meta-rarity definition of anomalousness has no parameters that need to be set arbitrarily or by experimentation. The definition is, in this sense, self-tuning: it uses the distribution itself as sufficient context for determining anomalousness. One reasonable way to use these advantages of the definition is to set a threshold based on the size (or throughput) of the data to be analyzed. If a cyber security data set has, say, one million events that will be scored for anomalousness, then setting a threshold at $\log_2 1,000,000 = 19.93 \approx 20 = \alpha$ should yield at most one false alert assuming that events are really generated according to $f$ by the theorem. Deviations in the number of anomalies will indicate that the model (i.e., choice of $f$) does not match the generating distribution. This mismatch could be because f was not properly selected or tuned, or it could be because there is another source of events. In either case, exploration of the anomalies will provide insight into both the state of the system and changes within it.

EXAMPLES

Figure 5:
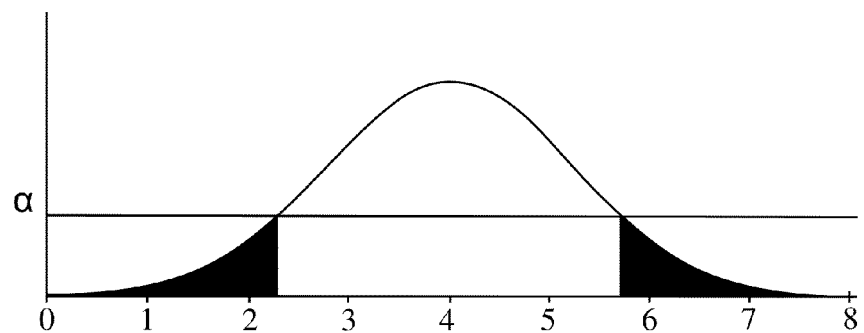
FIG. 5 is a graph illustrating a Gaussian distribution curve for probability density and the area associated with a tuning parameter.

A Gaussian example is considered first. Consider a Gaussian distribution, where the above-described definition of anomalousness is (monotonically) equivalent to a z-score. The z-score essentially captures the normalized distance to the mean and offers regulatability as the distributions are known. However, the z-score is specific to Gaussian distributions, making comparability across different distributions difficult. FIG. 5 shows how the anomaly definition picks out the tails of a Gaussian distribution, in agreement with a z-score-based definition of anomalousness.

For a Gaussian distribution with mean μ and standard deviation σ, the probability density function $f: R \to R_{\geq 0}$ is defined as $$f(x) = \frac{1}{\sqrt{2\pi}\sigma} \exp\left(\frac{(x-\mu)^2}{2\sigma^2}\right)$$

The Anomalousness is then given by $$A_f(x) = -\log_2 P_f(f(X) \leq f(x)).$$

It can be seen that $f(y) \leq f(x)$ if and only if $(y-\mu)^2$. The probability of the set of such y is then the sum of the tail probabilities, which can be given in terms of the cumulative distribution function F. The left tail has probability $F(\mu - |x - \mu|)$ and the right tail has probability $1 - F(\mu + |x - \mu|)$. However, by the symmetry of the Gaussian distribution, these two probabilities are equal. Hence the anomalousness can be written as $$A_f(x) = -\log_2(2F(\mu - |x - \mu|))$$

Typically, the observations are first standardized by defining $$z = \frac{x - \mu}{\sigma}.$$

Let G denote the cumulative distribution function of the standardized one-dimensional Gaussian. Then the anomalousness becomes $$A_f(z) = -\log_2(2G(-|z|))$$

Evidently, the more x deviates from μ, the more anomalous. Therefore, the anomaly score is monotonically equivalent to the z-score. However, the anomalousness $A_f$ does not require the parametric assumption of the z-score.

For a given false alert rate and a given Gaussian distribution, an appropriate threshold can be deduced. This shows that the bits of rarity definition provides regulatability in this case. However, the threshold depends explicitly on the distribution parameters. Bits of rarity (at a given threshold) gives different false alert rates for different parameters. Hence the bits of rarity definition does not provide comparability across distributions.

A multimariate Gaussian example is considered next. For a k-dimensional multivariate Gaussian, the probability distribution function $f: R^k \to R$ is defined to be $$f(x) = \frac{1}{\sqrt{2\pi}\sigma} \exp\left(\frac{(x-\mu)^2}{2\sigma^2}\right)$$

where μ is the mean and Σ is the positive definite covariance matrix. (Here, x and μ are thought of column vectors, and $\upsilon'$ for $\upsilon$ a column vector is the transpose of $\upsilon$, which is a row vector).

Figure 6:
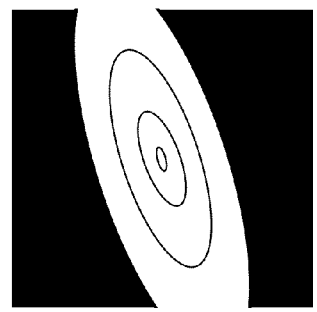
FIG. 6 shows a graph of concentric ellipses associated with a multivariate Gaussian distribution.

Note that $f$ is monotonic in $-(\chi-\mu)^t \Sigma^{-1} (\chi-\mu)$. FIG. 6 shows the level sets of the distribution. The anomalousness of an event χ is then the probability of an event being outside that level curve. (Note that this observation uses the unimodality of $f$.) Since Σ is positive definite, its square root $S = \sqrt{\Sigma}$ can be computed such that $\Sigma = S^t S$. Then, $$A_f(x) = -\log_2 P_f(\|S^{-1}(X-\mu)\| \geq \|S^{-1}(x-\mu)\|).$$

Thus, the definition of anomalousness agrees with common practice, as it identifies the tails. In fact, this shows that the anomalousness of a multivariate Gaussian event is monotonically equivalent to its Mahalanobis distance, a common reparameterization used in machine learning. Mahalanobis distance, like the z-score, can be used to provide regulatability, but fails to provide comparability across distributions.

Figure 7:
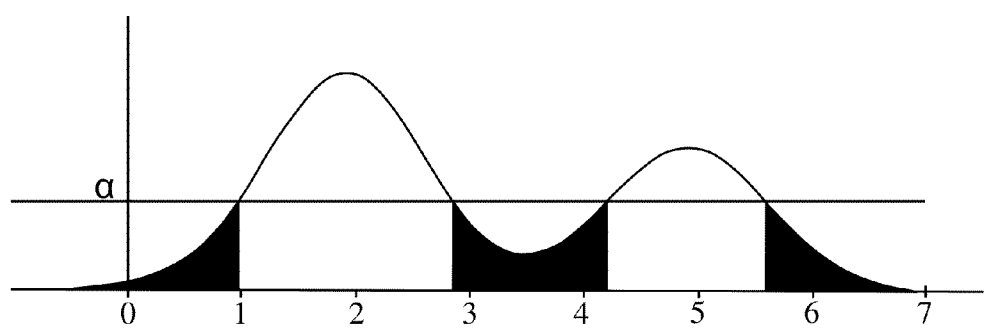
FIG. 7 shows a probability function that is a weighted sum of multiple Gaussian distributions.

The next example is a Gaussian Mixture. The two previous examples show that the distance to the mean (appropriately normalized) provides a reasonable definition of anomalousness for some distributions. However, it is problematic for multimodal distributions. The Mixture of Gaussian distributions has a probability density function that is the weighted sum of multiple Gaussian distributions, as shown in FIG. 7. Potentially, the mean of a Mixture of Gaussian distribution could be an anomaly, since it can fall in a valley between the modes. This example illustrates that a general definition of anomalousness cannot be based on identifying just the tails. The bits of rarity and the bits of meta-rarity definitions both capture the rare events in the middle of the distribution as anomalous.

The next example is for Multinomials. Bits of meta-rarity apply equally well to discrete distributions. For these, the anomalousness of x is the log base two of the sum of all probabilities less than or equal to $P_f(x)$. This is demonstrated in FIG. 8. Because of the comparability, a comparison can be made between the anomalousness of a multinomial variable with the anomalousness of, say, a Gaussian mixture variable. Thus, different variable types can be used in generating an anomaly score and the anomaly scores are comparable. Another advantage of this approach is that it extends to any random variable, inclusive of complex probabilistic constructions, such as random graphs and stochastic processes.

The final example is specific to cyber security data sets. The example data set can include entries, wherein each entry is comprised of a timestamp, source IP address, source port, destination IP address, destination port, protocol, and message code. A variable can be derived from a log. Then a probability distribution can be estimated. Finally, events can be scored for anomalousness.

The specific cyber security example is for IP-to-IP by role. For a given observation, the following pair can be extracted: (Source IP role, destination IP role). For each IP address, a role was assigned. The possible roles were Workstation, Firewall, DNS, Web Server, and Unassigned, which are abbreviated as W, F, D, S, and U. Other network-based hardware or software resources can be used. Any such pair can be taken as the observed value of a random multinomial variable X. Let $N_{a,b}$ be the number of firewall log entries with source IP role a and destination IP role b. The probabilities $f(a, b)$ are estimated by $N_{a,b}/\Sigma_{x,y} N_{x,y}$. (Incorporating priors would assist with the scoring of previously unseen events.) The anomalousness of a pair (a, b) is given by $$A_f((a, b)) = -\log_2 \sum_{\{(x, y) \mid f(x, y) \leq f(a, b)\}} f(x, y).$$

Figures 8, 9:
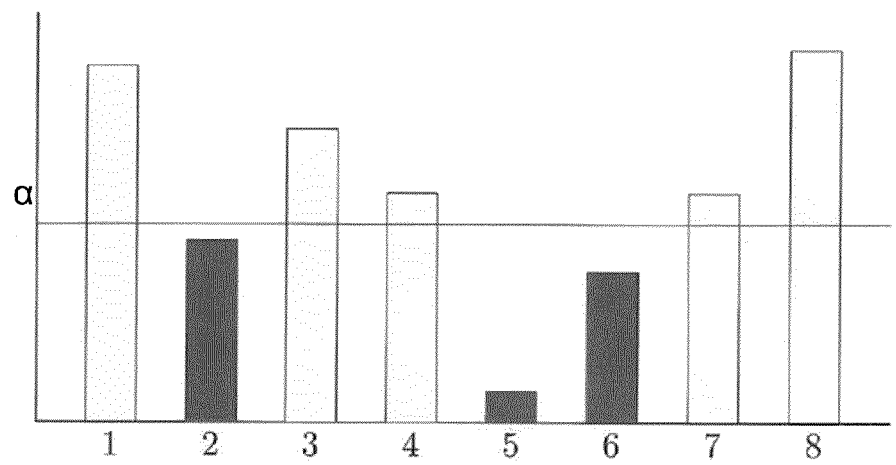
FIG. 8 shows an embodiment wherein discrete random variables are used.
FIG. 9 is an example table showing anomaly scores in a network environment.
Figures 10, 11:
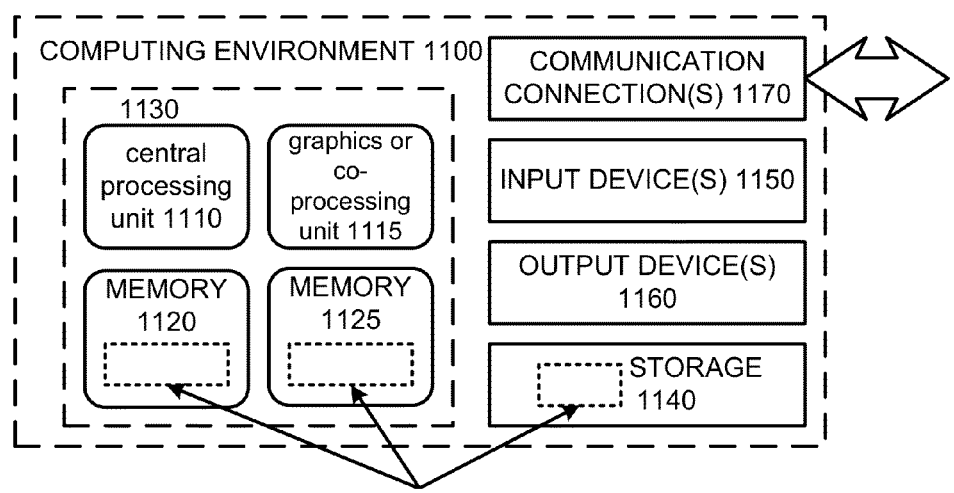
FIG. 10 shows another example table with anomaly scores in a network environment.
FIG. 11 depicts a generalized example of a suitable computing environment in which the described innovations may be implemented.

The observed probabilities and anomaly scores for the random variable are summarized in FIGS. 9 and 10.

The most anomalous communication originates from the firewall and terminates at a workstation with an anomalous score of 21.669. Indeed traffic classified in this group represents communication specifically between the firewall and the log server. On one hand, the relative lack of communication conforms with expectations of standard network behavior; however, further analysis indicates that communication between the firewall and the log server surprisingly terminates after 15 minutes of the 40 hour dataset.

The second most anomalous communication originates from the DNS server and terminates at a workstation with an anomalous score of 16.311. Further analysis of this traffic indicates attacks on the DNS server involving ports 135, 137, 139, and 445, all of which are associated with file-sharing traffic.

The third most anomalous communication originates from the DNS server and terminates at a DNS sever with an anomalous score of 14.472. Further analysis of this traffic indicates normal DNS traffic. It is noteworthy that the traffic from DNS to DNS is more anomalous than traffic from DNS to Unlabeled. This trend indicates a possible loss of control of the DNS server.

In this example, the anomaly scoring served to identify atypical events in a streaming environment. The insights by this process provided a useful step in developing a comprehensive situational understanding of the network.

A principled probability-based definition of anomalousness has been defined that is reasonable, general (in that it applies to anything modeled by a probability distribution), comparable (in that scores of disparate types of events can be compared), and regulatable (in that the rate of false alerts can be set in advance).

The following proof can be used to further support the description.

Adopting measure theory notation $$A_f(x) = -\log_2(\mu\{t : f(t) \leq f(x)\}).$$

Note that $$\{x : \mu\{t : f(t) \leq (x)\} \leq \mu\{t : f(t) \leq f(y)\}\} = x : f(x) \leq f(y)\}.$$

Proposition A.1: Fix $y \in D$. Then $$P(A_f(X) \geq A_f(y)) = 2^{-A_f(y)}$$

Proof. $P(A_f(X) \geq A_f(y))$ may be rewritten as $$= \mu\{x : A_f(x) \geq A_f(y)\}$$
$$= \mu\{x : -\log_2(\mu\{t : f(t) \leq f(x)\}) \geq -\log_2(\mu\{t : f(t) \leq f(y)\})\}$$
$$= \mu\{x : \mu\{t : f(t) \leq f(x)\} \leq \mu\{t : f(t) \leq f(y)\}$$
$$= \mu\{x : f(x) \leq f(y)\}$$
$$= 2^{-A_f(y)},$$

which proves the proposition.

Recall that $P(A_f(X) \geq \alpha) = \mu\{x : A_f(x) \geq \alpha$. The proof can be broken into two cases.

Case 1: Suppose that for all $y \in D$, $A_f(y) < \alpha$. The result is trivially true as $\{x : A_f(x) \geq \alpha\} = \emptyset$.

Case 2: Now suppose that $\{x : A_f(x) \geq \alpha\} \neq \emptyset$, so that there exists some y such that $A(y) \geq \alpha$. Then set $r = \inf\{A_f(x) : A_f(x) \geq \alpha\}$, and let $x_n \in D$ so that $A_f(x_n) \downarrow r$. Hence, $$\{x : A_f(x) \geq \alpha\} = \bigcap_{n=1}^{\infty} \{x : A_f(x) \geq A_f(x_n)\},$$

the sets on the right being nested. By the finiteness of the measure, $$\mu\{x : A_f(x) \geq \alpha\} = \frac{\lim}{n} \mu\{x : A_f(x) \geq A_f(x_n)\}$$
$$= \frac{\lim}{n} 2^{-Af(xn)}$$
$$= \frac{\lim}{n} 2^{-r} \leq 2^{-\alpha},$$

since $r \geq \alpha$.

The following is a further a proof that any anomaly score on a finite set can be realized by a probability distribution. Further, it is shown that $-\log_b$ is not flexible enough to let every A-score be realized via our definition.

As described above, given a probability distribution $f$, the following three characteristics should be realized by any anomaly score:

(1) $A_f$ respects the distribution; that is, $f(x) > f(y) \leftrightarrow A_f(x) < A_f(y)$.

(2) $A_f$ is defined on any distribution.

(3) $A_f$ is comparable across distributions. Specifically, fixing a threshold $\alpha$ so that we classify $\{x : A(x) \geq \alpha\}$ as "anomalous," and $\{x\ A(x) < \alpha\}$ as "non-anomalous" will specify a fixed percentage, say d %, and least probable d % of the distribution as "anomalous" events (and the most probably (100−d) % as "non-anomalous". Hence, regardless of the distribution, for fixed threshold, the anomalous events are the most rare for their given distribution.

Hence, the following definition was made: $A_f(x) = -\log_2 p(f(X) \leq f(x))$.

While this definition preserves the desired qualities of an anomaly score, it is too restrictive. It can be argued that the anomaly scoring arises without first putting a probability distribution on the data. Moreover, it can be argued that using heuristic methods for anomaly detection (for example, clustering, density estimation) to find an anomaly score is implicitly imposing a probability distribution on the data, and that making an explicit assumption of the probability distribution is better. The theorem below proves this "implicit probability distribution" exists if a member of the class of functions $\{\log_b\}_b$ is allowed to replace $\log_2$.

Theorem: Let $A: \{x_1, \ldots, x_n\} \to [0, \infty]$, with $\min_{x_j} A(x_j) = 0$. Then there exists $b > 1$, and a probability distribution $p$ on $\{x_1, \ldots, x_n\}$ so that $$A(x) = -\log_b\left(\sum_{\{x_j : p(x_j) \leq p(x)\}} p(x_j)\right).$$

Note that since $\{x_1, \ldots, x_n\}$ is finite, assuming $\min_{x_j} A(x_j) = 0$ is without loss of generality via translation.

Proof. Since $$\left(\sum_{\{x_j : p(x_j) \leq p(x)\}} p(x_j)\right)$$

is increasing in $p(x)$, then $p(x_j) > p(x_k) \leftrightarrow A(x_j) < A(x_k)$.

Without loss of generality, write $A(x_j)$ in decreasing order, and let l be the number of values A takes. $A_1, \ldots, A_l$ are set to these l values, so that $$A_1 := A(x_1) = \ldots = A(x_{k_1})$$
$$A_2 := A(x_{k_1+1}) = \ldots = A(x_{k_1+k_2})$$
$$\vdots$$
$$A_l := A(x_{n-k_l+1}) = \ldots = A(x_n)$$

where k is the multiplicity of $A_j$. Notice $A_1 > A_2 > \ldots > A_l = 0$.

Set $$p_1 := p(x_1) = \ldots = p(x_{k_1})$$
$$p_2 := p(x_{k_1+1}) = \ldots = p(x_{k_1+k_2})$$
$$\vdots$$
$$p_l := p(x_{n-k_l+.}) = \ldots = p(x_n)$$

so the task is to find $p_1, \ldots, p_l$ so that the definitions of $A(x)$ and $p(x_j)$ hold.

However, these hold if and only if $$p_1 < p_2 < \ldots < p_l$$

and $$k_1 p_1 + \ldots + k_{l-1} p_{l-1} + k_l p_l = b^{-A_l}$$
$$k_1 p_1 + \ldots + k_{l-1} p_{l-1} = b^{-A_{l-1}}$$
$$\vdots$$
$$k_1 p_1 = b^{-A_1}.$$

Solving the system of equations inductively shows that $$p_1 = \frac{b^{-A_j}}{k_1}$$

and for $1 < j \leq l$, $$p_j = \frac{b^{-A_j} - b^{-A_{j-1}}}{k_j}$$

Since $A_1 > A_2 > \ldots > A_l = 0$, b is chosen large enough so that $p_1 < p_2 < \ldots < p_l$ holds.

From the proof above, b can be chosen depending on the given score A; specifically, if one attempts to fix b á priori, then there are l equations to be solved, plus one inequality, but only l unknowns; hence while $p_1, \ldots, p_l$ can be chosen to satisfy the equalities, there is no guarantee the required inequality will hold. To illustrate this, we give an example where b=2 fails.

Let $A: \{x_1, \ldots, x_5\} \to [0, \infty)$ by $A(x_1)=2$, $A(x_2)=A(x_3)=A(x_4)=1$, and $A(x_5)=0$. Now the necessary equations in proof above require $$p_1 = b^{-2}$$
$$p_2 = \frac{b^{-1} - b^{-2}}{3}$$
$$p_3 = 1 - b^{-1}.$$

So fixing, say, b=2 á priori gives $p_1 = 1/4$
$p_2 = 1/12$
$p_3 = 1/2$ so that $p_1 < p_2 < p_3$ fails. Thus for this example, a larger b is needed. An example of a b that clearly works in this case is b=10. To see this satisfies the necessary inequality, the following calculation can be done:

$p_1 = 1/100$ $p_2 = 3/100$ $p_3 = 9/10$.

As a next step, the theorem can be applied to a larger set $\tilde{x}$, perhaps $\tilde{x} \subseteq \mathbb{R}^n$ to accommodate the continuous probability distribution case. From the previous example, it can be noted that having A repeat the value 1 three times (while A only took value 2 at one point) necessitated a relatively large value of b. In fact, the domain $\tilde{x}$ is changed to a larger set, thereby allowing $A(\tilde{x})$ to be infinite, an increasingly large disparity can be chosen in the multiplicity of each value in $A(\tilde{x})$ so that no value of b suffices. Consider the following example where $\tilde{x} = [-1, e]$, $A(\tilde{x}) = \mathbb{N}$. It can be shown that no value of b can satisfy the necessary inequality.

Let $A: [-1, e] \to [0, \infty]$ as follows, $$A(x) = \begin{cases} 0 & x = 0 \\ 1 & x \in (0, 1] \\ 2 & x \in \left(1, 1 + \frac{1}{2}\right] \\ 3 & x \in \left(1 + \frac{1}{2}, 1 + \left|\frac{1}{2} + \frac{1}{3!}\right]\right] \\ \vdots & \vdots \\ n & \left(\sum_{j=1}^{n-1} \frac{1}{j!}, \sum_{j=1}^{n} \frac{1}{j!}\right] \\ \vdots & \vdots \end{cases}$$

A probability distribution, $p(x)$ can be constructed so that $A(x) = -\log_b \int_{\{t: p(t) \leq p(x)\}} p(t) dt.$ As before since $(\int_{\{t: p(t) \leq p(x)\}} p(t) dt)$ is increasing in $p(x)$, it can be seen that $p(x_j) > p(x_k) \leftrightarrow A(x_j) < A(x_k)$ Hence, it is desirable to find countably many values, $p_j$, $j = 0, 1, 2, \ldots$ that give the respective value of $p(x)$ on $\{x: A(x) = j\}$. Thus, $p_0 > p_1 > p_2 > \ldots$.

Let $k_j$ = measure of $\{x: A(x) = j\}$. In this case, it can be seen, $k_0 = 1$, and for $j > 0$, $$k_j = \frac{1}{j!}.$$

As in the proof of the theorem, this gives a (countable) system of equations, namely $k_0 p_0 + k_1 p_1 + k_2 p_2 + \ldots = b^0$ $k_1 p_1 + k_2 p_2 + \ldots = b^{-1}$ $\vdots$ $\sum_{j \geq n} k_j p_j = b^{-n}$ $\vdots$ Inductively solving gives $$p_0 = 1 - b^{-1}$$

$$p_1 = \frac{b^{-1} - b^{-2}}{k_1}$$

$$\vdots$$

$$p_n = \frac{b^{-n} - b^{-(n+1)}}{k_n}$$

$$\vdots$$

It can be observed that for no value of b can the inequality $p_0 > p_1 > p_2 > \ldots$ hold, for in order to satisfy this inequality, the following should be true:

$$\frac{b^{-(j-1)} - b^{j}}{k_{j-1}} > \frac{b^{j} - b^{-(j+1)}}{k_j}$$

$$\Leftrightarrow \frac{b^{-j+1} - b^{j}}{b^{j} - b^{-j-1}} > \frac{k_{j-1}}{k_j}$$

$$\Leftrightarrow b > \frac{k_{j-1}}{k_j} = j$$

for every j.

Consider a further definition $A_f(x) = g \circ p(f(X) \leq f(x))$ for any continuous function
g: $[0, 1] \to [0, \infty]$ that satisfies
(1) $g(0) = \infty$.
(2) $g(1) = 0$.
(3) g is strictly decreasing.

Notice $g(0) = \infty$ is required so that the elements with probability 0 are maximally anomalous, and similarly, $g(1) = 0$ ensures the events with maximal likelihood are least anomalous. Decreasing g ensures that $A_f$ respects the distribution given by $f$. Continuity is required of g to prohibit any jumps in $A_f$ that are not caused by the underlying probability distribution. Notice that in many cases (e.g. discrete) the range of $f$ is discrete, so g is trivially continuous as g's domain $\{y: y = p(f(X) \leq f(x)) \text{ for some } x\}$ is discrete.

Now it can be shown that given any anomaly score $A(x)$ there exists a function g and a probability distribution $f$.

As another example, let $A: [-1, e] \to [0, \infty]$ as follows, $$A(x) = \begin{cases} 0 & x = 0 \\ 1 & x \in (0, 1] \\ 2 & x \in \left(1, 1 + \frac{1}{2}\right] \\ 3 & x \in \left(1 + \frac{1}{2}, 1 + \frac{1}{2} + \frac{1}{3!}\right] \\ \vdots & \vdots \\ n & \left(\sum_{j=1}^{n-1} \frac{1}{j!}, \sum_{j=1}^{n} \frac{1}{j!}\right] \\ \vdots & \vdots \end{cases}$$

A probability distribution, $p(x)$ can be constructed and a function appropriate function g found so that $A(x) = q \circ \int_{\{t: p(t) \leq p(x)\}} p(t) dt.$ As before since $(\int_{\{t: p(t) \leq p(x)\}} p(t) dt)$ is increasing in $p(x)$, the equation $p(x_j) > p(x_k)$, $A(x_j) < A(x_k)$ must hold, and therefore one must find countably many values, $p_j, j=0, 1, 2, \ldots$ that give the respective value of $p(x)$ on $\{x:A(x)=j\}$.

As before, let $k_j$=measure of $\{x:A(x)=j\}$ so that $k_0=1$, and for $j>0$, $$k_j = \frac{1}{j!}.$$

Now encountering our first effective difference, the new (countable) system of equations is $$k_0 p_0 + k_1 p_1 + k_2 p_2 + \ldots = g^{-1}(0)$$
$$k_1 p_1 + k_2 p_2 + \ldots = g^{-1}(1)$$
$$\vdots$$
$$\sum_{j \geq n} k_j p_j = g^{-1}(n)$$
$$\vdots$$

Inductively solving gives $$p_0 = 1 - g^{-1}(1)$$
$$p_1 = \frac{g^{-1}(1) - g^{-1}(2)}{k_1}$$
$$\vdots$$
$$p_n = \frac{g^{-1}(n) - g^{-1}(n+1)}{k_n}$$
$$\vdots$$

Notice the requirement that $\lim_{t \to 0} g(t) = \infty$ appears again here, as it is also necessary for $p(x)$ to be a probability distribution. Specifically, $$\sum_j k_j p_j = \lim_N \sum_{j=1}^N k_j p_j = 1 - \lim_N g^{-1}(N).$$

One can choose a g satisfying the requirements of the following equation $p_0 > p_1 > p_2 >$. Or, conversely, any set $\{p_j\}$ can be chosen satisfying this equation, and deduce g.

For example, if we require $p_j = 2^{-(j+1)}$ (quick check: $\Sigma_0^\infty 2^{-(j+1)} = 1$ so this is a probability distribution) it can be observed g from 10, and then check to make sure g decreases from ∞ to 0. Solving 10 inductively it can be seen that $$g^{-1}(0) = 1$$
$$g^{-1}(1) = \frac{1}{2}$$
$$g^{-1}(2) = \frac{1}{2^2 * 1!} = \frac{1}{4}$$
$$\vdots$$
$$g^{-1}(n) = 1 - \frac{1}{2^1 * 0!} - \frac{1}{2^2 * 1!} - \ldots - \frac{1}{2^n * (n-1)!}$$
$$\vdots$$

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method comprising:
    detecting anomalous events using a first anomaly detector positioned in parallel with a second anomaly detector, the detecting comprising:
        receiving a first log file including a first plurality of events from a first data source in the first anomaly detector including a first memory;
        receiving a second log file including a second plurality of events from a second data source that is a different type than the first data source in the second anomaly detector including a second memory;
        using the first log file, generating a first anomaly score, the generation being derived from an area associated with a probability density function of the first log file, wherein generating the first anomaly score includes using the formula $A_f(x) = -\log_b Pf(f(X) \leq f(x))$ where $b > 1$;
        using the second log file, generating a second anomaly score, the generation being derived from an area associated with a probability density function of the second log file; and
        comparing the first and second anomaly scores so as to compare anomalies from the first data source to the second data source, which are of different types.

2. The method of claim 1, wherein a function used to calculate the anomaly score is tunable through user input.

3. The method of claim 1, wherein the first and second log files include disparate event types.

4. The method of claim 1, wherein each of the first and second log files are streaming data.

5. The method of claim 1, wherein comparing the first and second anomaly scores includes generating a linear combination of the anomaly scores using weighted inputs.

6. A method comprising:
    detecting anomalous events using a first anomaly detector positioned in parallel with a second anomaly detector, the detecting comprising:
        receiving a first log file including a first plurality of events from a first data source in the first anomaly detector including a first memory;
        receiving a second log file including a second plurality of events from a second data source that is a different type than the first data source in the second anomaly detector including a second memory;
        using the first log file, generating a first anomaly score, the generation being derived from an area associated with a probability density function of the first log file;

using the second log file, generating a second anomaly score, the generation being derived from an area associated with a probability density function of the second log file; and comparing the first and second anomaly scores so as to compare anomalies from the first data source to the second data source, which are of different types;

wherein generating the first anomaly score includes using the function $P_f(A_f(x) \geq \alpha) \leq b^{-\alpha}$ wherein $\alpha$ is a tunable parameter to change a number of false alerts and b is any number >1.

7. The method of claim 6, wherein a function used to calculate the anomaly score is tunable through user input.

8. The method of claim 6, wherein the first and second log files include disparate event types.

9. The method of claim 6, wherein each of the first and second log files are streaming data.

10. The method of claim 6, wherein comparing the first and second anomaly scores includes generating a linear combination of the anomaly scores using weighted inputs.

11. A non-transitory computer-readable storage having instructions thereon for executing a method of detecting anomalous events, the method comprising:

receiving a plurality of input network events from disparate network sources in a plurality of anomaly detectors coupled in parallel;

receiving a first log file including a first plurality of the input network events from a first data source in a first anomaly detector of the plurality of anomaly detectors including a first memory;

receiving a second log file including a second plurality of the input network events from a second data source that is a different type than the first data source in a second anomaly detector of the plurality of anomaly detectors including a second memory;

calculating multiple anomaly scores using the plurality of anomaly detectors for each of the plurality of input network events using a function formed at least in part by the expression $A_f(x) = -\log_b P_f(f(X) \leq f(x))$ where b>1 wherein f(X) is related to a probability of an occurrence of an event, f(x) is a current event being analyzed, and $P_f$ is a probability determination so that the anomalous scores are comparable; and comparing the multiple anomaly scores so as to compare anomalies from the first data source to the second data source.

12. The non-transitory computer-readable storage of claim 11, wherein the function used to calculate the anomaly scores is tunable.

13. The non-transitory computer-readable storage of claim 11, wherein receiving the plurality of input network events includes receiving multiple log files that include disparate event types.

14. The non-transitory computer-readable storage of claim 11, wherein receiving the plurality of input network events includes receiving the input network events as streaming data.

15. The non-transitory computer-readable storage of claim 11, further including comparing the anomaly scores, wherein the comparing of anomaly scores includes generating a linear combination of the anomaly scores using weighted inputs.

16. The non-transitory computer-readable storage of claim 11, wherein the network sources are selected from a list including one or more of the following: a firewall, a workstation, a domain name system (DNS) server, and a web server.

17. The non-transitory computer-readable storage of claim 11, wherein the network events include a timestamp, a source Internet Protocol (IP) address, a destination IP address, a destination port, a protocol and a message code.

18. A non-transitory computer-readable storage having instructions thereon for executing a method, the method comprising:

detecting anomalous events, the detecting including:

receiving a plurality of input network events from disparate network sources in a plurality of anomaly detectors coupled in parallel;

receiving a first log file including a first plurality of input network events from a first data source in a first anomaly detector of the plurality of anomaly detectors;

receiving a second log file including a second plurality of input network events from a second data source that is a different type than the first data source in a second anomaly detector of the plurality of anomaly detectors;

generating multiple anomaly scores using the first and second of the plurality of anomaly detectors for each of the first and second plurality of input network events using a function $P_f(A_f(x) \geq \alpha) b^{-\alpha}$ wherein $\alpha$ is a tunable parameter to change a number of false alerts and b is any number >1.

19. The non-transitory computer-readable storage of claim 18, wherein the function used to calculate the anomaly scores is tunable.

20. The non-transitory computer-readable storage of claim 18, wherein receiving the plurality of input network events includes receiving multiple log files that include disparate event types.

21. The non-transitory computer-readable storage of claim 18, wherein receiving the plurality of input network events includes receiving the input network events as streaming data.

22. The non-transitory computer-readable storage of claim 18, further including comparing the anomaly scores, wherein the comparing of anomaly scores includes generating a linear combination of the anomaly scores using weighted inputs.

23. The non-transitory computer-readable storage of claim 18, wherein the network sources are selected from a list including one or more of the following: a firewall, a workstation, a domain name system (DNS) server, and a web server.

24. The non-transitory computer-readable storage of claim 18, wherein the network events include a timestamp, a source Internet Protocol (IP) address, a destination IP address, a destination port, a protocol and a message code.

25. A system for detecting anomalous events, comprising:

a first anomaly detector for receiving a first log file;

a second anomaly detector for receiving a second log file, the second anomaly detector coupled in parallel with the first anomaly detector, wherein both the first and second anomaly detectors include memory registers;

wherein the first and second anomaly detectors calculate anomaly scores for the respective first and second log files, the anomaly detectors using a function formed at least in part by the expression $A_f(x) = -\log_b P_f(f(X) \leq f(x))$ where b>1, wherein f(X) is related to a probability of an occurrence of an event, f(x) is a current event being analyzed and $P_f$ is a probability determination; and a hardware comparator coupled to the anomaly detectors for comparing the anomaly scores.

26. The system of claim 25, wherein the first log file and the second log file are sourced from devices having different platforms.

27. The system of claim 25, wherein the first and second anomaly detectors are tunable to change a number of false alerts.

28. A system for detecting anomalous events, comprising:
a first anomaly detector for receiving a first log file;
a second anomaly detector for receiving a second log file, the second anomaly detector coupled in parallel with the first anomaly detector, wherein both the first and second anomaly detectors include memory registers;
wherein the first and second anomaly detectors calculate anomaly scores for the respective first and second log files, the anomaly detectors using a function $P_f(A_f(x) \geq \alpha)$ $b^{-\alpha}$ wherein $\alpha$ is a tunable parameter to change a number of false alerts, b is any number >1 and Pf is a probability determination; and
a hardware comparator coupled to the anomaly detectors for comparing the anomaly scores.

29. The system of claim 28, wherein the first log file and the second log file are sourced from devices having different platforms.

30. The system of claim 28, wherein the first and second anomaly detectors are tunable to change a number of false alerts.

* * * * *